(12) United States Patent
Nishimura et al.

(10) Patent No.: US 10,448,584 B2
(45) Date of Patent: Oct. 22, 2019

(54) MEDIUM FOR PLANT CULTIVATION, AND APPARATUS AND METHOD FOR PLANT CULTIVATION INCLUDING THE SAME

(71) Applicant: KURARAY CO., LTD., Kurashiki-shi (JP)

(72) Inventors: Yasuyo Nishimura, Kochi (JP); Yasuhiro Nonaka, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 528 days.

(21) Appl. No.: 15/027,848

(22) PCT Filed: Sep. 26, 2014

(86) PCT No.: PCT/JP2014/075687
§ 371 (c)(1),
(2) Date: Apr. 7, 2016

(87) PCT Pub. No.: WO2015/053097
PCT Pub. Date: Apr. 16, 2015

(65) Prior Publication Data
US 2016/0249541 A1    Sep. 1, 2016

(30) Foreign Application Priority Data

Oct. 7, 2013 (JP) ................................. 2013-210359
Oct. 7, 2013 (JP) ................................. 2013-210360

(51) Int. Cl.
*A01G 31/00* (2018.01)
*A01G 1/00* (2006.01)
(Continued)

(52) U.S. Cl.
CPC ............. *A01G 24/00* (2018.02); *A01G 27/04* (2013.01)

(58) Field of Classification Search
None
See application file for complete search history.

(56) References Cited

U.S. PATENT DOCUMENTS

| 6,286,254 B1 | 9/2001 | Obonai et al. |
| 2007/0101644 A1 | 5/2007 | Fujimaru et al. |
| 2013/0312325 A1 | 11/2013 | Nishimura et al. |

FOREIGN PATENT DOCUMENTS

| CN | 1390444 A | 1/2003 |
| CN | 101411302 A | 4/2009 |

(Continued)

OTHER PUBLICATIONS

Extended European Search Report dated May 18, 2017 in Patent Application No. 14852597.5.

(Continued)

*Primary Examiner* — Ronak C Patel
(74) *Attorney, Agent, or Firm* — Oblon, McClelland, Maier & Neustadt, L.L.P.

(57) ABSTRACT

The present invention provides a medium for plant cultivation including a thermoplastic resin containing at least one of an ethylene unit and a propylene unit, wherein an extract obtained by treating 10 g of the thermoplastic resin with 50 mL of ion-exchange water at 95° C. for 4 hours has a pH at 25° C. not less than 4 and not more than 9; a medium for plant cultivation allowing a plant to be efficiently grown regardless of the type of the plant with an apparatus and a method for plant cultivation including the medium for plant cultivation; and an apparatus and a method for plant cultivation including the medium for plant cultivation.

9 Claims, 2 Drawing Sheets

(51) Int. Cl.
*A01G 24/00* (2018.01)
*A01G 27/04* (2006.01)

(56) References Cited

FOREIGN PATENT DOCUMENTS

| | | |
|---|---|---|
| CN | 201947750 U | 8/2011 |
| CN | 102617961 A | 8/2012 |
| CN | 103214292 A | 7/2013 |
| EP | 1 704 771 A1 | 9/2006 |
| JP | 2-109920 A | 4/1990 |
| JP | 6-98627 A | 4/1994 |
| JP | 8-280281 A | 10/1996 |
| JP | 2002-65053 A | 3/2002 |
| JP | 2002-171851 A | 6/2002 |
| JP | 2004-58469 A | 2/2004 |
| JP | 2007-190876 A | 8/2007 |
| JP | 2007-209218 A | 8/2007 |
| JP | 2008-48751 A | 3/2008 |
| JP | 2011-78316 A | 4/2011 |
| JP | 2012-200178 A | 10/2012 |
| WO | WO 2005/086992 A1 | 9/2005 |
| WO | WO 2007/011045 A1 | 1/2007 |
| WO | 2012/108374 A1 | 8/2012 |

OTHER PUBLICATIONS

Combined Chinese Office Action and Search Report dated Jan. 17, 2018 in Chinese Patent Application No. 201480055313.5 (with English translation of the Office Action and English translation of Category of Cited Documents), citing documents AK through AO therein, 14 pages.

Japanese Office Action dated Jan. 30, 2018 in Japanese Patent Application No. 2013-210360 (with English translation), citing documents AP and AQ therein, 5 pages.

Japanese Office Action dated Feb. 27, 2018 in Japanese Patent Application No. 2014-198476 (with English translation), citing documents AR through AV therein, 6 pages.

Office Action dated Aug. 9, 2018 in Korean Patent Application No. 10-2016-7011756, with English translation citing documents AO therein, 3 pages.

International Search Report dated Dec. 22, 2014 in PCT/JP2014/075687 filed Sep. 26, 2014.

(a)

(b)

(c)

MEDIUM FOR PLANT CULTIVATION, AND APPARATUS AND METHOD FOR PLANT CULTIVATION INCLUDING THE SAME

TECHNICAL FIELD

The present invention relates to a medium for plant cultivation, and an apparatus and a method for plant cultivation including the medium for plant cultivation that can be used instead of conventional soils and rock wool in cultivating various crops such as vegetables, fruits, grains, and the like, including flowering plants and root vegetables.

BACKGROUND ART

Hydroponics, which does not use soil for cultivating crops, is free of damage from continuous cropping, is independent of soil diseases and growth conditions, and facilitates control of the cultivation environment and the management of nutrients and water. Hydroponics also achieves automation and laborsaving, and thus, is attracting attention as a cultivation method providing high cleanliness and fertilizer efficiency of crops.

Solid media for hydroponics, which are soaked in water, are required to have a certain degree of water resistance, and have water permeability, water-retaining ability, air permeability, strength, and the like. For example, rock wool, which is obtained by bundling a natural stone (mostly basalt) formed into fibers, is conventionally known as a solid medium for hydroponics.

In hydroponics, because roots are set inside a solid medium, replacement of the solid medium with a fresh one may be needed. The use of rock wool as the solid medium, however, is disadvantageous in that recycling is difficult. Moreover, because rock wool is an inorganic substance, there is no effective method for disposing of used rock wool. Methods currently adopted for disposing of used rock wool include a method in which used rock wool is discarded as industrial waste, and a method in which used rock wool is plowed into a rice field in small amounts. Disposal of used rock wool using these methods, however, is limited. Further, because rock wool has an excessive amount of water retention and contains a large amount of water, root vegetables cannot become enlarged and thus, are difficult to cultivate. Hence, there is a need for a medium that retains physical properties required in a medium for plant cultivation, such as water resistance, water permeability, water-retaining ability, air permeability, strength, and the like, is physicochemically stable and allows crops to be sufficiently grown, and is less environmentally hazardous.

Japanese Patent Laying-Open No. 8-280281 (PTD 1) discloses a medium for plant cultivation containing a polyvinyl alcohol. PTD 1 describes that, for example, a completely saponified polyvinyl alcohol resin having a saponification degree of 98 mol % or more is used as a binder of charcoal powder. PTD 1 also describes that such a completely saponified polyvinyl alcohol resin having a saponification degree of 98 mol % or more is not readily soluble in water while being hydrophilic, and when it is used as the binder of charcoal powder, a medium is obtained that has improved wettability for water on the surface of charcoal powder particles, and does not readily collapse when soaked in water. However, even though the completely saponified polyvinyl alcohol resin having a saponification degree of 98 mol % or more is used, it is still a water-soluble polymer, and hence, long-term use of the medium described in PTD 1 causes gradual elution of the polyvinyl alcohol resin, making long-term growth of crops difficult.

Japanese Patent Laying-Open No. 2-109920 (PTD 2) also describes a hydroponics method using a porous material in the form of grains or chips as a medium, wherein the porous material is preferably made of a polyvinyl alcohol as a raw material, in view of its capacity to retain water absorbency and hygroscopy. As stated above, however, because the polyvinyl alcohol is a water-soluble polymer, it has poor long-term stability under wet conditions. The polyvinyl alcohol is thus lacking in practicality for long-term growth of crops, because of its difficulty in maintaining the shape of the medium.

Japanese Patent Laying-Open No. 6-98627 (PTD 3) discloses an aromatic artificial medium containing a water-absorbing gel, the water-absorbing gel obtained by incorporating water and a perfume into an absorbent material. PTD 3 describes that an ethylene-vinyl alcohol copolymer may be used as the absorbent material. The use of the ethylene-vinyl alcohol copolymer can prevent gradual elution as with the polyvinyl alcohol described above.

The Applicant proposes in WO 2012/108374 (PTD 4) a medium for plant cultivation containing an ethylene-vinyl alcohol copolymer chip. This medium for plant cultivation described in PTD 4 can be provided as a medium for plant cultivation that allows crops to be sufficiently grown, is excellent in recyclability and can be used repeatedly, can be readily discarded after use by incineration or the like, and is less environmentally hazardous.

CITATION LIST

Patent Document

PTD 1: Japanese Patent Laying-Open No. 8-280281
PTD 2: Japanese Patent Laying-Open No. 2-109920
PTD 3: Japanese Patent Laying-Open No. 6-98627
PTD 4: WO 2012/108374

SUMMARY OF INVENTION

Technical Problem

However, there is not a sufficient finding concerning a medium for plant cultivation containing a thermoplastic resin. The present inventors found a problem in that variations in the pH of the thermoplastic resin change the pH of water supplied to a plant cultivated using the medium for plant cultivation, which affects the growth condition of the plant.

The present invention was made to solve the aforementioned problem, and an object of the invention is to provide a medium for plant cultivation allowing a plant to be efficiently grown regardless of the type of the plant, and an apparatus and a method for plant cultivation including the medium for plant cultivation.

Solution to Problem

The present inventors focused on variations in the pH of the thermoplastic resin used in the medium for plant cultivation, and found that by specifying the pH within a specific range, a medium for plant cultivation can be provided that allows a plant to be grown regardless of the type of the plant, thus completing the present invention. The present invention is as summarized below.

The medium for plant cultivation according to the present invention is a medium for plant cultivation including a thermoplastic resin containing at least one of an ethylene unit and a propylene unit, an extract obtained by treating 10 g of the thermoplastic resin with 50 mL of ion-exchange water at 95° C. for 4 hours having a pH at 25° C. not less than 4 and not more than 9.

In the medium for plant cultivation according to the invention, a chip containing the thermoplastic resin is preferably used.

In the medium for plant cultivation according to the invention, the thermoplastic resin is preferably an olefin copolymer containing, in total structural units thereof, 20 mol % or more of at least one of the ethylene unit and the propylene unit.

In the medium for plant cultivation according to the invention, the thermoplastic resin preferably contains an ethylene-vinyl alcohol copolymer.

In the medium for plant cultivation according to the invention, the chip is columnar, flat, or flaky in shape, and having an arithmetic mean roughness (Ra), as measured in accordance with JIS B 0601, of 0.05 μm or more, on a side face of the columnar chip, on a curved face of the flat chip in a circumferential direction with a shorter-side direction taken as a central axis, or on a main face of the flaky chip.

In the medium for plant cultivation according to the invention, the arithmetic mean roughness is from 0.05 μm to 10 μm.

In the medium for plant cultivation according to the invention, the medium for plant cultivation preferably has an amount of water retention not less than 5 g and not more than 50 g, relative to a volume of 100 mL.

The present invention also provides an apparatus for plant cultivation including the medium for plant cultivation according to the invention described above.

The present invention also provides a method for plant cultivation including the medium for plant cultivation according to the invention described above.

Advantageous Effects of Invention

According to the invention, in the cultivation of various crops such as vegetables, fruits, grains, and the like, including flowering plants and root vegetables, these crops can be grown sufficiently with high efficiency, as demonstrated in examples and comparative examples described below. Further, according to the invention, a medium for plant cultivation can be provided that is excellent in recyclability and can be used repeatedly, can be readily discarded after use by incineration or the like, and is less environmentally hazardous.

BRIEF DESCRIPTION OF DRAWINGS

FIGS. 1(a) to (c) are schematic diagrams each illustrating a shape of a chip used in a medium for plant cultivation according to the invention, wherein FIG. 1(a) illustrates a columnar shape, FIG. 1(b) illustrates a flat shape, and FIG. 1(c) illustrates a flaky shape.

DESCRIPTION OF EMBODIMENTS

Figure 1:
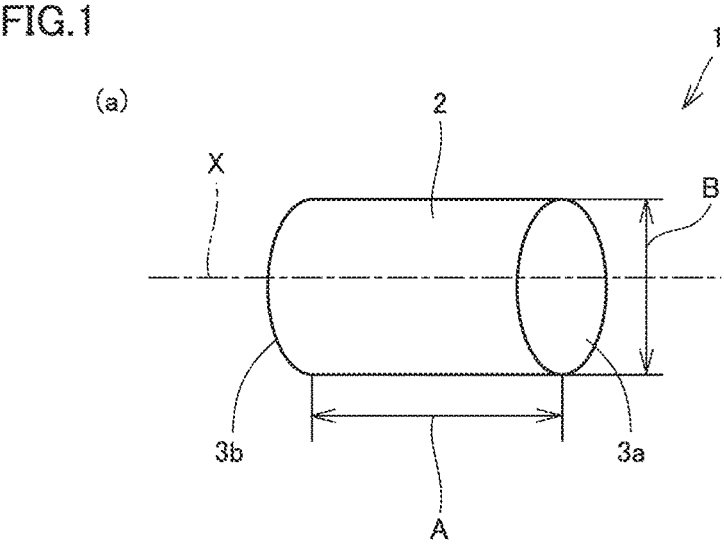
Figure 1:
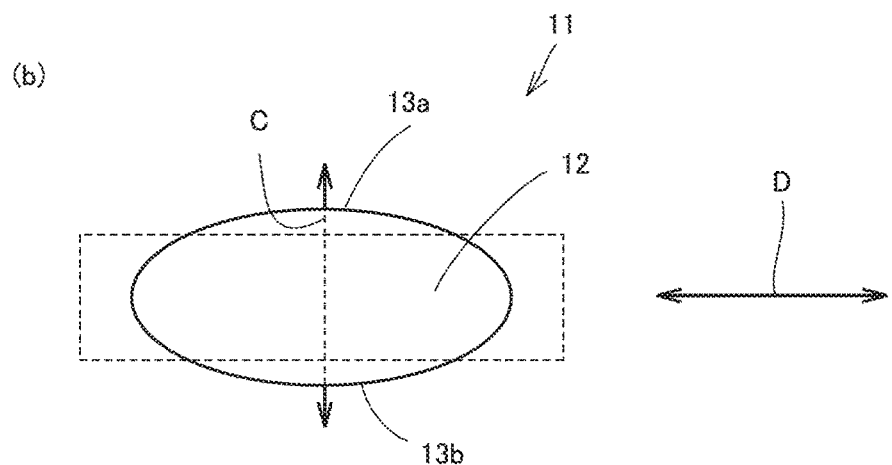
Figure 1:
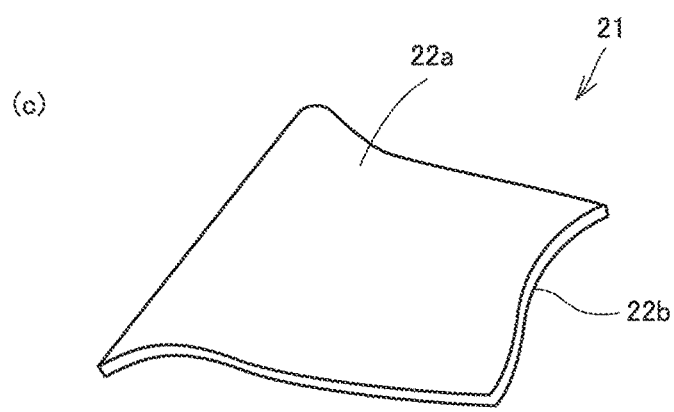

A medium for plant cultivation according to the present invention includes a thermoplastic resin containing at least one of an ethylene unit and a propylene unit. The medium for plant cultivation according to the invention is not limited in its form as long as it includes this thermoplastic resin. The medium for plant cultivation may be in the form of a bed of a plurality of chips of the thermoplastic resin, or in the form of a nonwoven fabric including the thermoplastic resin. In view of the efficiency of plant growth, however, the chips of the thermoplastic resin are preferably used.

In the medium for plant cultivation according to the invention, an extract obtained by stirring and extracting 10 g of the thermoplastic resin with 50 mL of ion-exchange water at 95° C. for 4 hours has a pH at 25° C. not less than 4 and not more than 9. A lower limit of the pH is preferably 4.3, more preferably 4.5, and still more preferably 4.7. An upper limit of the pH is preferably 8.8, more preferably 8.5, and still more preferably 7.5. As used herein, the term "ion-exchange water" refers to purified water deionized using a cation-exchange resin that replaces cations contained in raw water with hydrogen ions and an anion-exchange resin that replaces anions contained in the raw water with hydroxyl ions. If the pH of the extract is less than 4, root rot may occur in the plant, and if the pH exceeds 8, there may be damage to the elongation of the roots of the plant. A specific method of measuring the pH will be described below in EXAMPLES.

When the chips of the thermoplastic resin described above are used as the medium for plant cultivation, a lower limit of the bulk density thereof is preferably 0.1 g/cm$^3$, and more preferably 0.2 g/cm$^3$. An upper limit of the bulk density thereof is preferably 1.1 g/cm$^3$, and more preferably 0.9 g/cm$^3$. If the bulk density of the chips is less than 0.1 g/cm$^3$, the roots of root vegetables do not tend to readily enlarge, and if the bulk density of the chips exceeds 1.1 g/cm$^3$, there is a tendency toward damage to the elongation of the roots of the plant. A specific method of measuring the bulk density of the chips will be described below in EXAMPLES.

While the thermoplastic resin according to the invention may be any that contains at least one of the ethylene unit and the propylene unit, and may also be a homopolymer such as polyethylene (PE), polypropylene (PP), or the like, the thermoplastic resin is preferably an olefin copolymer containing, in total structural units thereof, 20 mol % or more (more preferably 20 to 60 mol %, and still more preferably 22 to 58 mol %) of at least one of the ethylene unit and the propylene unit. When the olefin copolymer contains 20 mol % or more of at least one of the ethylene unit and the propylene unit, excellent long-term stability under wet conditions is obtained, and the shape of the medium can be maintained in growing crops over a long term. If the ethylene content falls below the above-defined range, the resulting medium for plant cultivation will have poor durability, and the ethylene-vinyl alcohol copolymer may elute when used continuously over a long time. If the ethylene content falls above the above-defined range, the resulting medium for plant cultivation may have reduced hydrophilicity or strength.

Examples of the thermoplastic resin containing at least one of the ethylene unit and the propylene unit may include polyethylene, polypropylene, an ethylene-propylene copolymer, an ethylene-vinyl alcohol copolymer, a copolymer of ethylene and an α-olefin having 4 or more carbon atoms, an ethylene-vinyl ester copolymer, an ethylene-acrylate copolymer, and those obtained by modifying any of the above with an unsaturated carboxylic acid, or by graft-modifying any of the above with a derivative thereof, or by modifying any of the above with maleic anhydride. Among the above, the ethylene-vinyl alcohol copolymer is preferable.

The chip according to the invention may be made of only the ethylene-vinyl alcohol copolymer, or may form a composition with other resin component(s), for example, various polyolefins (polyethylene, polypropylene, poly-1-butene, poly4-methyl-1-pentene, an ethylene-propylene copolymer, a copolymer of ethylene and an α-olefin having 4 or more carbon atoms, an ethylene-vinyl ester copolymer, an ethylene-acrylate copolymer, and polyolefins obtained by modifying any of the above with an unsaturated carboxylic acid, or by graft-modifying any of the above with a derivative thereof, or by modifying any of the above with maleic anhydride, etc.), various nylons (nylon-6, nylon-66, nylon-6/66 copolymer, etc.), polyvinyl chloride, polyvinylidene chloride, polyester, polystyrene, polyacrylonitrile, polyurethane, polyacetal, modified polyvinyl alcohol, and the like. The content of the ethylene-vinyl alcohol copolymer based on a total mass of the ethylene-vinyl alcohol copolymer and the other resin component(s) is preferably 3 mass % or more, more preferably 5 mass % or more, and still more preferably 10 mass % or more, because the resulting medium for plant cultivation will have an improved amount of water retention.

In the chip according to the invention, the surface of the other resin component(s) described above may be coated with the ethylene-vinyl alcohol copolymer. The coating thickness of the ethylene-vinyl alcohol copolymer is preferably 0.1 μm or more, more preferably 0.3 μm or more, and still more preferably 0.5 μm or more. If the coating thickness of the ethylene-vinyl alcohol copolymer is smaller than the above-defined thickness, the resulting medium for plant cultivation may have a reduced amount of water retention.

When the thermoplastic resin according to the invention is an ethylene-vinyl alcohol copolymer mainly containing an ethylene unit ($-CH_2CH_2-$) and a vinyl alcohol unit ($-CH_2-CH(OH)-$), the proportion of a total number of moles of the ethylene unit and the vinyl alcohol unit, relative to the number of moles of the total structural units forming the ethylene-vinyl alcohol copolymer, is preferably 80 mol % or more, more preferably 90 mol % or more, still more preferably 95 mol % or more, and particularly preferably 99 mol % or more.

The method for manufacturing the ethylene-vinyl alcohol copolymer according to the invention is not particularly limited, and a known suitable manufacturing method may be adopted. For example, the ethylene-vinyl alcohol copolymer is generally manufactured using a method in which an ethylene-vinyl ester copolymer obtained by copolymerization of ethylene and a vinyl ester-based monomer is saponified in an organic solvent containing an alcohol, in the presence of a saponification catalyst.

Examples of the vinyl ester-based monomer described above may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, and the like. Among the above, vinyl acetate is preferable.

To copolymerize ethylene and the vinyl ester-based monomer, a known method may be adopted such as solution polymerization, block polymerization, suspension polymerization, emulsion polymerization, or the like. As a polymerization initiator, a suitable polymerization initiator such as an azo-based initiator, a peroxide-based initiator, a redox-based initiator, or the like is selected depending on the polymerization method. At this time, polymerization may be performed in the presence of a thiol compound such as thioacetic acid or mercaptopropionic acid, or other chain transfer agent.

A saponification reaction may be performed by adopting alcoholysis, hydrolysis, or the like in which a known alkali catalyst or acid catalyst is used as the saponification catalyst in an organic solvent. In particular, a saponification reaction using methanol as a solvent and using a sodium hydroxide catalyst is simple and the most preferable.

The ethylene-vinyl alcohol copolymer described above has a melt flow rate (measured using the method defined in JIS K 7210 under a temperature of 210° C. and a load of 2.16 kg) preferably in the range of 0.1 to 100 g/10 minutes, more preferably in the range of 0.5 to 50 g/10 minutes, and still more preferably in the range of 1 to 20 g/10 minutes, in order to achieve good processability into chips. If the melt flow rate falls below the above-defined range, the torque in a processing machine may increase excessively when the ethylene-vinyl alcohol copolymer is processed into chips by melt-kneading. If the melt flow rate falls above the above-defined range, continuous production of chips will be difficult, and moreover, the strength of the resulting chips may become insufficient, leading to reduced performance of the medium.

When the medium for plant cultivation according to the invention is in the form of the chips described above, the shape thereof is not particularly limited, and may be columnar (cylindrical or prismatic), spherical, flat (shape having an oval cross section), flaky (shape like a flat piece having two, front and rear, main faces), and polyhedral, for example. Now, FIGS. 1(a) to (c) are schematic diagrams each illustrating a preferable shape of the chip according to the invention, wherein FIG. 1(a) illustrates a columnar shape, FIG. 1(b) illustrates a flat shape, and FIG. 1(c) illustrates a flaky shape. The medium for plant cultivation according to the invention preferably has an arithmetic mean roughness of a certain value or more, on a specific face of the columnar, flat, or flaky chip. Each of these shapes will be described below with reference to each of the figures.

FIG. 1(a) illustrates a chip 1 having a cylindrical shape as an example of the columnar shape. As used herein, the term "cylindrical shape" refers to a columnar shape having a circular cross section (which may be either in the form of a perfect circle or an oval) in a direction perpendicular to an axial direction X. Generally, a straight distance A along axial direction X is greater than a diameter B of the circular cross section. Naturally, however, diameter B of the cross section and straight distance A along axial direction X may be approximately equal to each other, or diameter B of the cross section may be greater than straight distance A. When the medium for plant cultivation according to the invention is cylindrical chip 1, the arithmetic mean roughness (Ra) of a side face (circumferential side) 2, as measured in accordance with JIS B 0601, is preferably 0.05 μm or more. A lower limit of the arithmetic mean roughness is more preferably 0.10 μm, still more preferably 0.20 μm, and particularly preferably 0.30 μm. An upper limit of the arithmetic mean roughness is preferably 10.00 μm, more preferably 7.00 μm, and still more preferably 5.00 μm. The arithmetic mean roughness means that the surface becomes more rough (smoothness decreases) as the value increases. Note that the term "columnar shape" as used herein is in no way limited to this cylindrical shape, and may be a suitable prismatic shape, such as a triangular shape, quadratic shape, hexagonal shape, octagonal shape, or the like.

Furthermore, in the case of cylindrical chip 1, side face (circumferential face) 2 preferably has a mean width of the profile elements (RSm), as measured in accordance with JIS B 0601, of 20 μm or less, more preferably in the range of 1.00 to 20.00 μm, and still more preferably in the range of 1.50 to 15.00 µm. The mean width of the profile elements means that the surface becomes more rough (smoothness decreases) as the value decreases.

Cylindrical chip 1 is generally obtained by cutting to a suitable length (straight distance A described above) a strand including the thermoplastic resin containing at least one of the ethylene unit and the propylene unit. Thus, end faces (cut faces) 3a, 3b formed by being cut inherently have a rough surface. According to the present invention, it was found, however, that when side face (circumferential face) 2 smoother than end faces 3a, 3b has an arithmetic mean roughness of 0.05 µm or more, in particular, the amount of water retention of the chips described below is improved, contributing to the growth of not only root vegetables but also plants in general, which is preferable. In order to provide side face (circumferential face) 2 of cylindrical chip 1 with an arithmetic mean roughness of 0.05 µm or more, for example, side face (circumferential face) 2 of chip 1 after being cut may be provided with appropriate scratches using a suitable jig. Alternatively, for example, when preparing the above-described strand, a mold or the like may be used having an appropriate surface roughness to provide the side face of the chip with scratches to achieve the above-defined range of roughness.

FIG. 1(b) illustrates a chip 11 having a flat shape. As used herein, the term "flat shape" refers to a shape having an oval cross section. When the medium for plant cultivation according to the invention is flat chip 11, it is assumed that when flat chip 11 is allowed to stand still on a horizontal plane, a direction along a section having the longest straight distance along the horizontal direction is a longer direction (direction D in FIG. 1(b); parallel to the horizontal direction), and a direction perpendicular to longer direction D and perpendicular to the horizontal plane, and along the section having the longest straight distance, is a shorter direction C. Flat chip 11 according to the invention preferably has an arithmetic mean roughness (Ra), as measured in accordance with JIS B 0601, of 0.05 µm or more, on a circumferential curved face 12 perpendicular to shorter direction C and along longer direction D (that is, the region surrounded with the broken line in FIG. 1(b), as well as a region on the rear side with respect to the sheet surface of FIG. 1(b)). A lower limit of the arithmetic mean roughness is more preferably 0.10 µm, still more preferably 0.20 µm, and particularly preferably 0.30 µm. An upper limit of the arithmetic mean roughness is preferably 10.00 µm, more preferably 7.00 µm, and still more preferably 5.00 µm.

Furthermore, in the case of flat chip 11, circumferential curved face 12 preferably has a mean width of the profile elements (RSm), as measured in accordance with JIS B 0601, of 20 µm or less, more preferably in the range of 1.00 to 20.00 µm, and still more preferably in the range of 1.50 to 15.00 µm.

Flat chip 11 is generally obtained by, for example, hot cutting a melt including the thermoplastic resin containing at least one of the ethylene unit and the propylene unit. Thus, end faces (cut faces) 13a, 13b formed by being hot cut inherently have a rough surface. According to the present invention, it was found, however, that when circumferential curved face 12 smoother than end faces 13a, 13b has an arithmetic mean roughness of 0.05 µm or more, in particular, the amount of water retention of the chips described below can be improved, contributing to the growth of not only root vegetables but also plants in general, which is preferable. In order to provide circumferential curved face 12 of flat chip 11 with an arithmetic mean roughness of 0.05 µm or more, for example, circumferential curved face 12 of chip 11 after being cut may be provided with appropriate scratches using a suitable jig. Alternatively, for example, when preparing the above-described chip, a mold or the like may be used having an appropriate surface roughness to provide the side face of the chip with scratches to achieve the above-defined range of roughness.

FIG. 1(c) illustrates a chip 21 having a flaky shape. As used herein, the term "flaky shape" refers to a shape like a flat piece having two, front and rear, main faces. When the medium for plant cultivation according to the invention is flaky chip 21, the arithmetic mean roughness (Ra) of main faces 22a, 22b (front and rear faces), as measured in accordance with JIS B 0601, is preferably 0.05 µm or more. A lower limit of the arithmetic mean roughness is more preferably 0.10 µm, still more preferably 0.20 µm, and particularly preferably 0.30 µm. An upper limit of the arithmetic mean roughness is preferably 10.00 µm, more preferably 7.00 µm, and still more preferably 5.00 µm.

Furthermore, in the case of flaky chip 21, main faces 22a, 22b preferably have a mean width of the profile elements (RSm), as measured in accordance with JIS B 0601, of 20 µm or less, more preferably in the range of 1.00 to 20.00 µm, and still more preferably in the range of 1.50 to 15.00 µm.

Flaky chip 21 is generally obtained by forming the thermoplastic resin containing at least one of the ethylene unit and the propylene unit into a thin film-like molded product, and then crushing this molded product. The thin film-like molded product may be a laminated product. Examples of methods of preparing the laminated product may include, but are not particularly limited to, a method in which the thermoplastic resin containing at least one of the ethylene unit and the propylene unit is molded into a thin film, and a plurality of the thin films are laminated on one another and crimped together with a nip roll or the like; a method in which the thermoplastic resin containing at least one of the ethylene unit and the propylene unit is melt extruded into a molded product (film, sheet, or the like) obtained from the thermoplastic resin; a method in which the thermoplastic resin containing at least one of the ethylene unit and the propylene unit is co-extruded with other thermoplastic resin; a method in which the thermoplastic resin containing at least one of the ethylene unit and the propylene unit is co-injected with other thermoplastic resin; and a method in which the above-described molded product obtained from the thermoplastic resin containing at least one of the ethylene unit and the propylene unit is laminated to a film, a sheet, or the like of other base material, using a known adhesive such as an organic titanium compound, an isocyanate compound, a polyester-based compound, or the like. According to the present invention, it was found, however, that when the resulting main faces 22a, 22b have an arithmetic mean roughness of 0.05 µm or more as described above, in particular, the amount of water retention of the chips described below can be improved, contributing to the growth of not only root vegetables but also plants in general, which is preferable. In order to provide main faces 22a, 22b of flaky chip 21 with an arithmetic mean roughness of 0.05 µm or more, for example, main faces 22a, 22b of chip 21 after being crushed may be provided with appropriate scratches using a suitable jig. Alternatively, for example, a die or the like for molding into a thin film may be used having an appropriate surface roughness to provide the thin film-like main faces with scratches to achieve the above-defined range of roughness.

Note that in any of the cases where the chips have the columnar shape, flat shape, and flaky shape as described above, the arithmetic mean roughness (Ra) and the mean width of the profile elements (RSm) can be measured in accordance with JIS B0601: 2001, using a shape measuring laser microscope "VK-X200" (from Keyence Corporation), for example. In EXAMPLES described below, the measurement was conducted for 100 chips, and an average value thereof is calculated as the arithmetic mean roughness (Ra).

When the medium for plant cultivation according to the invention has an arithmetic mean roughness of a certain value or more on a specific face of the chips as described above, the amount of water retention of the chips is improved, contributing to the growth of not only root vegetables but also plants in general, compared to the case where the medium for plant cultivation does not have the arithmetic mean roughness.

The medium for plant cultivation according to the invention preferably has an amount of water retention in the range not less than 5 g and not more than 50 g, relative to a volume of 100 mL of the medium for plant cultivation. A lower limit of the amount of water retention is more preferably 10 g. An upper limit of the amount of water retention is more preferably 40 g. As used herein, the term "amount of water retention", for example, when the above-described chip of the thermoplastic resin is used as the medium for plant cultivation, refers to the amount of moisture held inside the chip and of moisture held between the chips. When the amount of water retention is 5 g or more as described above, the growth efficiency of plants is improved more than that conventionally grown. A specific method of measuring the amount of water retention will be described in detail below in EXAMPLES.

In the medium for plant cultivation according to the invention, a lower limit of the water content in the chip is preferably 3 mass %, more preferably 4 mass %, still more preferably 10 mass %, and particularly preferably 20 mass %. An upper limit of the water content is preferably 300 mass %, more preferably 250 mass %, and still more preferably 200 mass %. As used herein, the term "water content" in the medium for plant cultivation, for example, when the above-described chip of the thermoplastic resin is used as the medium for plant cultivation, refers to the content of water penetrated into voids formed inside the chip. A specific method of measuring the water content will also be described in detail below in EXAMPLES.

When the above-described chip is used as the medium for plant cultivation according to the invention, although the size of the chip is not particularly limited regardless of which shape the chip has, the chip preferably has a maximum length in the range of 1 to 50 mm, and more preferably in the range of 1 to 20 mm. Note that the maximum length can be measured using a vernier caliper.

While the medium for plant cultivation according to the invention may be formed of only the above-described thermoplastic resin, or may be formed of only the above-described thermoplastic resin and water, the medium for plant cultivation may optionally further contain other components in addition to the above-described thermoplastic resin and water, such as an alkali metal salt, a carbonate, carbon dioxide gas, a plasticizer, a stabilizer, a surfactant, a colorant, an ultraviolet absorbent, a slip agent, an antistatic agent, a desiccant, a crosslinking agent, a filler, and the like.

While the medium for plant cultivation according to the invention may be formed of only the above-described chip containing the thermoplastic resin, it may further contain, together with the chip, components such as rock wool, sand, soil, ceramic balls, coconut shell, bark, peat moss, bog moss, and the like. The content of the above-described chip containing the thermoplastic resin in the medium for plant cultivation according to the invention is preferably 50 mass % or more, more preferably 80 mass % or more, and still more preferably 95 mass % or more.

While the medium for plant cultivation according to the invention is not particularly limited in its form of use, it is preferably used as a medium for solution culture using a culture solution.

The type of the plant grown using the medium for plant cultivation according to the invention is not particularly limited, and examples of the plant may include vegetables, fruits, grains, and the like, including flowering plants and root vegetables. In particular, the medium for plant cultivation according to the invention is preferably used for cultivating vegetables such as Japanese radish, sweet potatoes, burdock roots, carrots, cucumbers, tomatoes, eggplants, green peppers, and the like. In particular, while the medium for plant cultivation according to the invention can be suitably used for cultivating root vegetables that have been difficult to cultivate with rock wool, it can also contribute to the growth of not only root vegetables but also plants in general.

The present invention also provides an apparatus for plant cultivation including the medium for plant cultivation according to the invention described above. The apparatus for plant cultivation according to the invention is not particularly limited as long as it includes the medium for plant cultivation according to the invention described above, and may include the structure of a conventionally known appropriate apparatus for plant cultivation, except for including the medium for plant cultivation.

Figure 2:
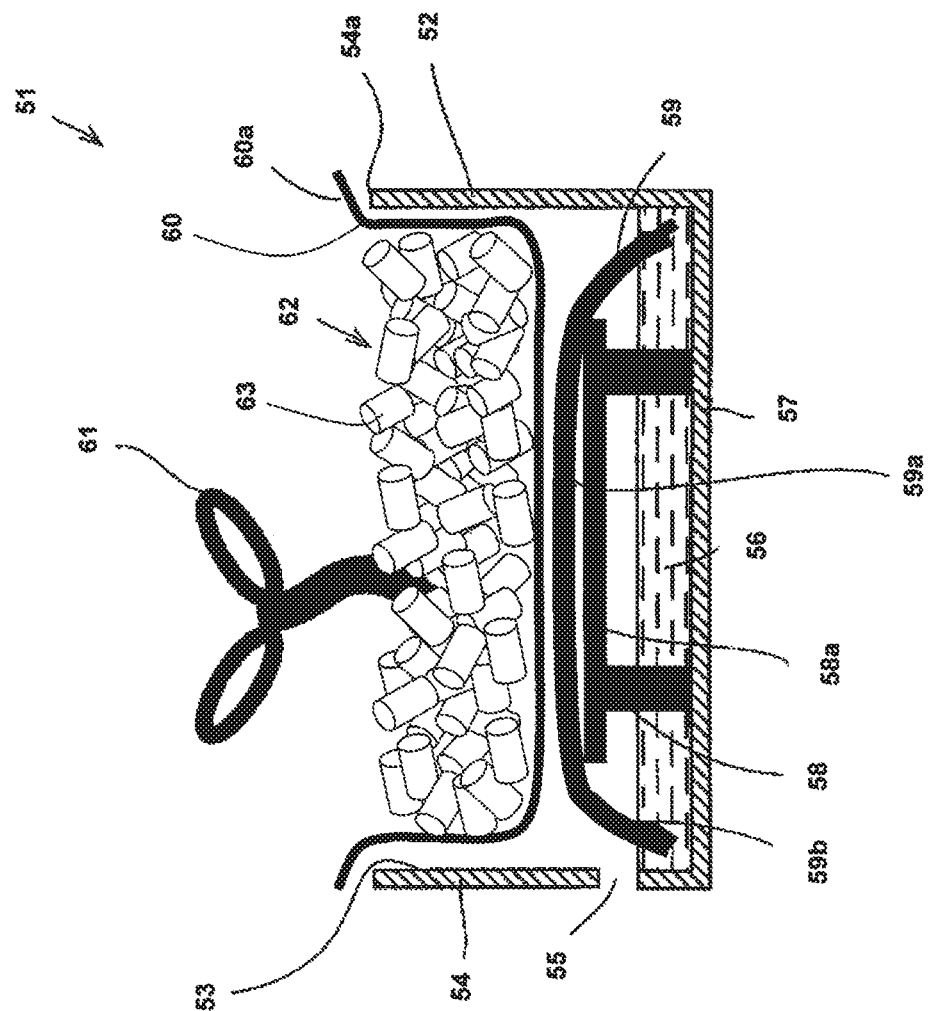
FIG. 2 is a diagram schematically illustrating a plant cultivation apparatus 1 in one preferred embodiment of the invention.

Now, FIG. 2 is a diagram schematically illustrating a plant cultivation apparatus 51 in one preferred embodiment of the invention. Exemplary plant cultivation apparatus 51 shown in FIG. 2 is a box-like article having an opening 53 in an upper portion thereof. Plant cultivation apparatus 51 includes a planter 52 having a drain hole 55 at an appropriate height of a side wall 54. Water 56 containing nutrients (nutrient solution) is contained in planter 52 up to a height (depth) such that it does not overflow from drain hole 55. A rack 58 is provided on a bottom wall 57 of planter 52 such that a mounting face 58a thereof is placed above the surface of water 56. A water-absorbing sheet 59 is provided over rack 58 to substantially cover bottom wall 57 of planter 52 when seen from above. Water-absorbing sheet 59 is a sheet-like material formed of, for example, a material such as a cellulose fiber, a nylon fiber, a vinylon fiber, a polyester fiber, a polyolefin fiber, a rayon fiber, an aramid fiber, a glass fiber, or the like. Water-absorbing sheet 59 is placed such that a central portion 59a thereof is positioned on mounting face 58a of rack 58, and ends 59b are soaked in water 56 within planter 52, and water-absorbing sheet 59 is configured such that water 56 absorbed through ends 59b is delivered to central portion 59a.

In the example shown in FIG. 2, a root-proof water-permeable sheet 60 is placed on water-absorbing sheet 59 such that ends 60a thereof are hooked over upper ends 54a of side walls 54 of planter 52. Root-proof water-permeable sheet 60 is preferably provided for cultivating root vegetables in plant cultivation apparatus 51, and may not be necessarily provided when a plant 61 to be grown is not a root vegetable. When root-proof water-permeable sheet 60 is provided, water 56 in planter 52 is delivered to root-proof water-permeable sheet 60 via water-absorbing sheet 59.

Root-proof water-permeable sheet 60 is a fabric, nonwoven fabric, or a mat-like material formed of a fibrous material, or is a sheet or the like formed of a resin such as any of various polyolefins (polyethylene, polypropylene, an ethylene-propylene copolymer, an ethylene-vinyl alcohol copolymer, an ethylene-vinyl ester copolymer, an ethylene-acrylate copolymer, and modified polyolefins obtained by modifying any of the above with an unsaturated carboxylic acid, or by graft-modifying any of the above with a derivative thereof, or by modifying any of the above with maleic anhydride), any of various nylons (nylon-6, nylon-66, nylon-6/66 copolymer, etc.), polyvinyl chloride, polyvinylidene chloride, polyester, polystyrene, polyacrylonitrile, polyurethane, polyacetal, modified polyvinyl alcohol, and the like. Root-proof water-permeable sheet 60 is a sheet that is hydrophilic, water-permeable, and flexible, and does not allow passage of roots. When the above-described sheet made of a resin is used as root-proof water-permeable sheet 60, it preferably has an infinite number of micropores in a uniform distribution, wherein the micropores preferably have a maximum size of 20 μm or less. If the maximum size of the micropores exceeds 20 μm, the roots of the plant may penetrate root-proof water-permeable sheet 60, enter water-absorbing sheet 59 and become tangled to absorb excess water, which may cause a problem in growing the plant. On the other hand, if the maximum size of the micropores is very small, for example, 5 μm or less, percolation of water from the water-absorbing sheet is inhibited, which may cause a problem in growing the plant. Because of its fine meshes, root-proof water-permeable sheet 60 has the property of being unlikely to pass water through, and readily holding water therein.

In the example shown in FIG. 2, a plant cultivation medium 62 according to the invention described above is placed on root-proof water-permeable sheet 60, and plant 61 is grown in plant cultivation medium 62. FIG. 2 shows an example in which a plurality of cylindrical chips 63 are used as plant cultivation medium 62 according to the invention.

The present invention also provides a method for plant cultivation including the medium for plant cultivation according to the invention described above. When the medium for plant cultivation according to the invention described above is used as a medium for hydroponics in the method for plant cultivation according to the invention, in an exemplary method, the medium for plant cultivation according to the invention may be placed in a container such as a pot, a nutrient solution may be added thereto, and then seeds may be sown or seedlings may be transplanted. In an alternative exemplary method, a cultivation bed in which the medium for plant cultivation according to the invention is laid may be prepared, and grown seedlings may be transplanted thereto for cultivating various types of crops.

EXAMPLES

The present invention will be described in more detail below with reference to examples and comparative examples, which are not intended to limit the invention.

Example 1

Preparation of Hydrous Ethylene-Vinyl Alcohol Copolymer Chips

Twenty-kilograms of an ethylene-vinyl alcohol copolymer having an ethylene content of 32 mol % and a saponification degree of 99 mol % or more were dissolved in a mixed solution of water/methanol=32/68 (weight ratio) with stirring at 80° C. for 12 hours, thus giving a 35 wt % ethylene-vinyl alcohol copolymer solution. Then, stirring was stopped and the temperature of the solution tank was reduced to 65° C., and the ethylene-vinyl alcohol copolymer solution was allowed to stand for 5 hours for degassing. The ethylene-vinyl alcohol copolymer solution was subsequently extruded from a metal plate having a circular opening with a diameter of 2.5 mm into a mixed solution of water/methanol=9/1 (weight ratio) at 5° C., and precipitated in the form of a strand, which was cut into cylindrical hydrous ethylene-vinyl alcohol copolymer chips.

Purification of Hydrous Ethylene-Vinyl Alcohol Copolymer Chips

Two-hundred liters of ion-exchange water were added to 40.2 kg of the hydrous ethylene-vinyl alcohol copolymer chips obtained above, and the hydrous ethylene-vinyl alcohol copolymer chips were washed with stirring at 25° C. for 2 hours, and then dehydrated. This operation was repeated twice. The hydrous ethylene-vinyl alcohol copolymer chips were subsequently washed with 1 g/L of an acetic acid solution with stirring at 25° C. for 2 hours, and then dehydrated. This operation was repeated twice. Further, the hydrous ethylene-vinyl alcohol copolymer chips were washed with 200 L of ion-exchange water with stirring at 25° C. for 2 hours, and then dehydrated. This operation was repeated six times. Cylindrical hydrous ethylene-vinyl alcohol copolymer chips (purified product) were thus obtained.

Method of Measuring Bulk Density

A volume of 1000 cm³ of the hydrous ethylene-vinyl alcohol copolymer chips (purified product) obtained above was measured in a graduated cylinder, and the weight thereof was measured as $W_1$ (g). A value calculated in accordance with the following equation (1) was determined as the bulk density:

$$\text{Bulk density (g/cm}^3\text{)}=W_1/1000 \qquad (1)$$

Method of Measuring the pH

The hydrous ethylene-vinyl alcohol copolymer chips (purified product) obtained above were ground by frost shattering, and the ground product was sieved through a sieve of a nominal size of 1 mm (in accordance with JIS Z 8801 of standard sieves). Ten grams (mass on a dry mass basis) of the ground product that passed through the sieve, and ion-exchange water adjusted to give a total amount of the water contained in the ground product that passed through the sieve and the ion-exchange water became 50 g, were introduced into a stoppered 100 mL conical flask. A cooling condenser was attached to the flask, and the contents were stirred and extracted at 95° C. for 4 hours. The extract was then cooled to 25° C., and the pH at 25° C. of the resulting extract was measured with an ion analyzer (MA235 from Mettler-Toledo Inc.). To calculate the mass on a dry mass basis of the ground product, the water content in 10 g of the ground chips was measured at a drying temperature of 180° C. for a drying time of 20 minutes, using a halogen moisture analyzer (HR73 from Mettler-Toledo Inc.).

Method of Measuring the Amount of Water Retention

To a 1 L beaker containing 500 mL of ion-exchange water, 200 mL of the above-described ethylene-vinyl alcohol copolymer chips (purified product) measured in a graduated cylinder were added and allowed to stand at 25° C. for 4 hours. The ethylene-vinyl alcohol copolymer chips were then dehydrated under rotation 30 times in a rotary drainer unit "Speedster" (from Kakusee Co. Ltd). The bottom of a 250 mL wide mouth jar (made of polyethylene; inner diameter of the opening: 30.5 mm; main body diameter: 61.5 mm; overall height: 125 mm) was provided with 40 holes with a diameter of 2 mm, at an interval of 1 cm or more between the holes, using an electric drill. A volume of 100 mL of the dehydrated chips described above measured in a graduated cylinder were placed in the wide mouth jar provided with the holes. The weight of the wide mouth jar containing the dehydrated chips was measured as $W_2$. Then, 2 L of ion-exchange water was placed in a 3 L beaker, which was gently sunk to a depth of 3 cm from the opening of the wide mouth jar containing the chips. The chips were confirmed to be soaked in the ion-exchange water within the wide mouth jar. After a minute, the wide mouth jar was removed from the beaker and allowed to stand still, to remove the ion-exchange water within the wide mouth jar through the 2 mm-diameter holes provided with the electric drill. After 5 hours, the weight of the wide mouth jar containing the chips was measured as $W_3$, and a value calculated in accordance with the following equation (2) was determined as the amount of water retention:

$$\text{Amount of water retention (g/100 mL)} = W_3 - W_2 \quad (2)$$

Method of Measuring the Water Content in the Hydrous Chips after the Water Treatment and the Dehydration Treatment To a 1 L beaker containing 500 mL of ion-exchange water, 200 mL of the above-described ethylene-vinyl alcohol copolymer chips (purified product) measured in a graduated cylinder were added and allowed to stand at 25° C. for 4 hours. Then, the chips were dehydrated under rotation 30 times in the rotary drainer unit, and the dehydrated chips were subjected to measurement of the water content in the hydrous chips after the water treatment and the dehydration treatment, under the conditions of 10 g of the hydrous chips after the water treatment and the dehydration treatment, a drying temperature of 180° C., and a drying time of 20 minutes, using the halogen moisture analyzer (HR73 from Mettler-Toledo Inc.). As used herein, the water content is represented in mass % on a dry mass basis of the chips.

Method of Measuring Arithmetic Mean Roughness (Ra)

With respect to the side face of the columnar chip, the curved face of the flat chip in the circumferential direction with the shorter-side direction taken as the central axis, or the main face of the flaky chip, measurement of arithmetic mean roughness (Ra) was conducted for 100 chips in accordance with IS B0601: 2001, using the shape measuring laser microscope "VK-X200" (from Keyence Corporation). An average value thereof was determined as the arithmetic mean roughness (Ra).

Method of Evaluating the Number of Enlarged Roots

A cultivation experiment was conducted in a greenhouse, using Japanese radish named "Tanshin". A planter having a drain hole at a height of 1 cm from the bottom (28.5 cm (upper width)×46.5 cm (upper length)×26 cm (depth); volume 28 L) was used. The water-absorbing sheet "Germ guard" (from Toyobo STC Co., Ltd) cut to a size larger than the mounting face of a rack was placed in the planter such that the sheet was laid over the rack, with an excess portion folded over the bottom. Further, a root-proof water-permeable sheet (from Toyobo STC Co., Ltd) was laid thereon on the interior side of the planter, and then the planter was filled with the thermoplastic resin to a depth of 20 cm. Seeds were sown directly in 15 holes at an interval of 7 cm (width) and 8 cm (length), with three seeds per hole, on Jul. 26, 2013. Thinning was performed on Aug. 12, 2013. For irrigation, a nutrient solution of a mixed solution of the fertilizers for hydroponics "OAT House No. 1", "OAT House No. 2", and "OAT House No. 5" from OAT Agrio Co., Ltd. (N: 98.7 ppm, P: 19.4 ppm, K: 125.7 ppm, Ca: 63.0 ppm, Mg: 13.4 ppm, Mn: 0.709 ppm, B: 0.487 ppm, Fe: 2.025 ppm, Cu: 0.018 ppm, Zn: 0.048 ppm, Mo: 0.019 ppm) was supplied using the "Tonbo Watering Can No. 4" (from Shinkigousei Co., Ltd.), about 3 to 6 times a day, depending on the weather and the growth condition. A harvest research was performed on Sep. 14, 2013. In the harvest research, the number of radishes having 1 g or more of enlarged roots, relative to the 15 holes in which they were grown, was counted, and the result was used for evaluating the number of enlarged roots.

Measurement of the ethylene-vinyl alcohol copolymer chips (purified product) according to Example 1, using each of the procedures described above, showed that the bulk density was 0.52 g/cm$^3$, the pH was 6.2, the amount of water retention was 12 g/100 mL, and the water content after the water treatment and the dehydration treatment was 102 mass %. The arithmetic mean roughness (Ra) of the side face (circumferential face) of the cylindrical chip was 0.12 μm. The number of radishes having 1 g or more of enlarged roots, relative to the 15 holes in which they were grown, was 15. The results are shown in Table 1.

Example 2

Cylindrical ethylene-vinyl alcohol copolymer chips (EVOH F101; ethylene content: 32 mol %, saponification degree: 99 mol % or more, from Kuraray, Co., Ltd.) were used as the medium for plant cultivation. Measurement of each of the physical properties as in Example 1 showed that the bulk density was 0.69 g/cm$^3$, the pH was 5.0, the amount of water retention was 11 g/100 mL, and the water content after the water treatment and the dehydration treatment was 4 mass %. The arithmetic mean roughness (Ra) of the side face (circumferential face) of the cylindrical chip was 0.09 μm. The number of radishes having 1 g or more of enlarged roots, relative to the 15 holes in which they were grown, was 14.

Example 3

The ethylene-vinyl alcohol copolymer chips (EVOH F101) used in Example 2 were re-pelletized under the following conditions, using a 25 mm extruder "D2020" (from Toyo Seiki Seisaku-Sho, Ltd.) (D (mm)=25, L/D=25, screw: co-rotating fully intermeshing type, the number of vents: single, the number of die holes: two (hole diameter: 3 mm)).

Re-Pelletizing Conditions

Extrusion temperature: feed zone/compression zone/metering zone/die=180° C./220° C./220° C./220° C.
Degree of vacuum at the vent: 50 Torr
Screw rotation speed: 100 rpm
Amount of discharge: 5.2 kg/hr
Measurement of each of the physical properties as in Example 1 showed that the bulk density was 0.75 g/cm$^3$, the pH was 5.8, the amount of water retention was 9 g/100 mL, and the water content after the water treatment and the dehydration treatment was 3 mass %. The arithmetic mean roughness (Ra) of the side face (circumferential face) of the cylindrical chip was 0.07 µm. The number of radishes having 1 g or more of enlarged roots, relative to the 15 holes in which they were grown, was 11.

Example 4

Flat polypropylene chips "NOVATECH-PP EA7A" (from Japan Polypropylene Corporation) were used as the medium for plant cultivation. Measurement of each of the physical properties as in Example 1 showed that the bulk density was 0.51 g/cm$^3$, the pH was 7.8, the amount of water retention was 2 g/100 mL, and the water content after the water treatment and the dehydration treatment was 1 mass %. The arithmetic mean roughness (Ra) of the curved face of the flat chip in the circumferential direction with the shorter-side direction taken as the central axis was 0.18 µm. The number of radishes having 1 g or more of enlarged roots, relative to the 15 holes in which they were grown, was 7.

Example 5

Flat polyethylene chips "NOVATECH-PE LF128" (from Japan Polyethylene Corporation) were used as the medium for plant cultivation. Measurement of each of the physical properties as in Example 1 showed that the bulk density was 0.52 g/cm$^3$, the pH was 7.6, the amount of water retention was 1 g/100 mL, and the water content after the water treatment and the dehydration treatment was 1 mass %. The arithmetic mean roughness (Ra) of the curved face of the flat chip in the circumferential direction with the shorter-side direction taken as the central axis was 0.19 µm. The number of radishes having 1 g or more of enlarged roots, relative to the 15 holes in which they were grown, was 6.

Comparative Example 1

To 200 L of an aqueous solution obtained by adding acetic acid to a concentration of 0.95 g/L, 40.4 kg of the hydrous ethylene-vinyl alcohol copolymer chips (purified product) according to Example 1 were introduced, and the chips were soaked at 25° C. for 6 hours, with occasional stirring. The hydrous ethylene-vinyl alcohol copolymer chips after being soaked were dehydrated by centrifugation, and then used as the medium for plant cultivation. Measurement of each of the physical properties as in Example 1 showed that the bulk density was 0.52 g/cm$^3$, the pH was 3.8, the amount of water retention was 12 g/100 mL, and the water content after the water treatment and the dehydration treatment was 102 mass %. The arithmetic mean roughness (Ra) of the side face (circumferential face) of the cylindrical chip was 0.12 µm. The number of radishes having 1 g or more of enlarged roots, relative to the 15 holes in which they were grown, was 0.

Comparative Example 2

To 200 L of an aqueous solution obtained by adding sodium carbonate to a concentration of 0.50 g/L, the hydrous ethylene-vinyl alcohol copolymer chips (purified product) according to Example 1 were introduced, and the chips were soaked at 25° C. for 6 hours, with occasional stirring. The hydrous ethylene-vinyl alcohol copolymer chips after being soaked were dehydrated by centrifugation, and then used as the medium for plant cultivation. Measurement of each of the physical properties as in Example 1 showed that the bulk density was 0.52 g/cm$^3$, the pH was 9.2, the amount of water retention was 12 g/100 mL, and the water content after the water treatment and the dehydration treatment was 102 mass %. The arithmetic mean roughness (Ra) of the side face (circumferential face) of the cylindrical chip was 0.12 µm. The number of radishes having 1 g or more of enlarged roots, relative to the 15 holes in which they were grown, was 0.

Comparative Example 3

A rock wool medium (from Nichias Corporation, size: 7 cm×6.5 cm×7.5 cm, with side faces plastic wrapped) was used as the medium for plant cultivation. Measurement of each of the physical properties as in Example 1 showed that the bulk density was 0.08 g/cm$^3$, the pH was 6.8, the amount of water retention was 62 g/100 mL, and the water content after the water treatment and the dehydration treatment was 2 mass %. The arithmetic mean roughness (Ra) of the rock wool medium surface was 3.61 µm. The number of radishes having 1 g or more of enlarged roots, relative to the 15 holes in which they were grown, was 0.

Comparative Example 4

Cylindrical polyethylene terephthalate chips (Kurapet 236R from Kuraray, Co., Ltd.) were used as the medium for plant cultivation. Measurement of each of the physical properties as in Example 1 showed that the bulk density was 0.93 g/cm$^3$, the pH was 7.1, the amount of water retention was 6 g/100 mL, and the water content after the water treatment and the dehydration treatment was 3 mass %. The arithmetic mean roughness (Ra) of the side face (circumferential face) of the cylindrical chip was 0.07 µm. The number of radishes having 1 g or more of enlarged roots, relative to the 15 holes in which they were grown, was 2.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Resin Type | EVOH | EVOH | EVOH | PP | PE | EVOH | EVOH | Rock Wool | PET |
| Shape | Cylindrical | Cylindrical | Cylindrical | Flat | Flat | Cylindrical | Cylindrical | — | Cylindrical |
| Bulk Density (g/cm$^3$) | 0.52 | 0.69 | 0.75 | 0.51 | 0.52 | 0.52 | 0.52 | 0.08 | 0.93 |
| pH | 6.2 | 5.0 | 5.8 | 7.8 | 7.6 | 3.8 | 9.2 | 6.8 | 7.1 |
| Surface Roughness (µm) | 0.12 | 0.09 | 0.07 | 0.18 | 0.19 | 0.12 | 0.12 | 3.61 | 0.07 |
| Amount of Water Retention (g/100 mL) | 12 | 11 | 9 | 2 | 1 | 12 | 12 | 62 | 6 |
| Water Content after Water Treatment (mass %) | 102 | 4 | 3 | 1 | 1 | 102 | 102 | 2 | 3 |
| Number of Enlarged Roots (Number) | 15 | 14 | 11 | 7 | 6 | 0 | 0 | 0 | 2 |

In Table 1, "EVOH" denotes the "ethylene-vinyl alcohol copolymer", "PP" denotes "polypropylene", "PE" denotes "polyethylene", and "PET" denotes "polyethylene terephthalate".

Example 6

Preparation of Hydrous Ethylene-Vinyl Alcohol Copolymer Chips

Twenty-kilograms of an ethylene-vinyl alcohol copolymer having an ethylene content of 32 mol % and a saponification degree of 99 mol % or more were dissolved in a mixed solution of water/methanol=32/68 (weight ratio) with stirring at 80° C. for 12 hours, thus giving a 37 wt % ethylene-vinyl alcohol copolymer solution. Then, stirring was stopped and the temperature of the solution tank was reduced to 65° C., and the ethylene-vinyl alcohol copolymer solution was allowed to stand for 5 hours for degassing. The ethylene-vinyl alcohol copolymer solution was subsequently extruded at 15 kg per hour from a metal plate having a circular opening with a diameter of 2.5 mm into a mixed solution of water/methanol=9/1 (weight ratio) at 5° C., and precipitated in the form of a strand, which was cut into cylindrical hydrous ethylene-vinyl alcohol copolymer chips having a straight distance A along axial direction X of 4.5 mm and a diameter B of 1.7 mm.

Preparation of Hydrous Ethylene-Vinyl Alcohol Copolymer Chips (Washed Product

Two-hundred liters of ion-exchange water were added to 38.0 kg of the hydrous ethylene-vinyl alcohol copolymer chips obtained above, and the hydrous ethylene-vinyl alcohol copolymer chips were washed with stirring at 25° C. for 2 hours, and then dehydrated in a centrifuge. This operation was repeated twice. The hydrous ethylene-vinyl alcohol copolymer chips were subsequently washed with 1 g/L of an acetic acid solution with stirring at 25° C. for 2 hours, and then dehydrated in a centrifuge. This operation was repeated twice. Further, the hydrous ethylene-vinyl alcohol copolymer chips were washed with 200 L of ion-exchange water with stirring at 25° C. for 2 hours, and then dehydrated in a centrifuge. This operation was repeated six times. Cylindrical hydrous ethylene-vinyl alcohol copolymer chips (washed product) were thus obtained.

Preparation of Dried Ethylene-Vinyl Alcohol Copolymer Chips

To 200 L of an aqueous solution containing 0.1 g/L of sodium acetate and 0.5 g/L of acetic acid, 38.0 kg of the above-described hydrous ethylene-vinyl alcohol copolymer chips (washed product) were introduced, and the chips were soaked and stirred at 25° C. for 5 hours. The chips after the soaking and stirring treatment were dehydrated in a centrifuge and then removed. The chips were dried at 80° C. for 3 hours, and then subsequently dried at 120° C. for 24 hours, thus giving dried cylindrical ethylene-vinyl alcohol copolymer chips.

The dried cylindrical ethylene-vinyl alcohol copolymer chips obtained above had a straight distance A along axial direction X of 3.78 mm and a diameter B of 1.31 mm (aspect ratio (A/B): 2.88). The arithmetic mean roughness (Ra) of the side face (circumferential face) of the chips was 0.04 μm, the amount of water retention was 4 g/100 mL, the bulk density was 0.67 g/cm$^3$, the pH was 5.0, and the water content after the water treatment and the dehydration treatment was 4 mass %. The number of radishes having 1 g or more of enlarged roots, relative to the 15 holes in which they were grown, was 11. The degree of growth of seedlings was evaluated as described below, using these chips. As a result, the fresh weight of the above-ground parts was 9.4 g, the dry matter weight of the above-ground parts was 0.79 g, and the ratio of dry matter in the above-ground parts was 8.4%. Ranking was determined by conducting determination of significant difference using a Tukey's test, and gave an E rating. The results are shown in Table 2. Note that in Examples 6 to 11, for the evaluation of the number of enlarged roots, seeding was performed on Apr. 17, 2014, and the harvest research was performed on Jun. 25, 2014.

Method of Evaluating Degree of Growth of Seedlings

On Jan. 11, 2013, seeds of cucumbers (brand "Shinryu") were forced to sprout in an incubator set at 30° C., and on Jan. 13, 2013, the sprouted seeds were sown in a seedling raising tray filled with composted bark for raising seedlings. On Jan. 28, 2013 when true leaves started evolving, seedlings were transplanted to a plant cultivation apparatus including the chips prepared in each of Examples 6 to 11, and specifically, nine seedlings were prepared for each of the media, and hydroponically cultivated. For irrigation, a nutrient solution of a mixed solution of the fertilizers for hydroponics "OAT House No. 1", "OAT House No. 2", and "OAT House No. 5" from OAT Agrio Co., Ltd. (N: 98.7 ppm, P: 19.4 ppm, K: 125.7 ppm, Ca: 63.0 ppm, Mg: 13.4 ppm, Mn: 0.709 ppm, B: 0.487 ppm, Fe: 2.025 ppm, Cu: 0.018 ppm, Zn: 0.048 ppm, Mo: 0.019 ppm) was supplied using a drip tube, about 1 to 4 times per day, depending on the weather. Then, on Mar. 3, 2013, the fresh weight of the above-ground parts (the weight of the foliage parts) and the dry matter weight of the above-ground parts of the grown seedlings were measured, and the ratio of dry matter in the above-ground parts was calculated to evaluate the degree of growth of seedlings. For the rating of the growth of cucumbers, Examples 6 to 11 were ranked in the order of higher significant difference in the fresh weight of the above-ground parts, determined using the Tukey's test, and each were rated as A, B, C, D, or E.

Example 7

The dried cylindrical ethylene-vinyl alcohol copolymer chips used in Example 6 were stirred in a tumbler (from Nissui-Kako Corporation) for 1 hour at a speed of 60 revolutions/minute. The cylindrical chips had a straight distance A along axial direction X of 3.78 mm and a diameter B of 1.31 mm (aspect ratio (A/B): 2.88). The arithmetic mean roughness (Ra) of the side face (circumferential face) of the chips was 0.09 μm, the amount of water retention was 11 g/100 mL, the bulk density was 0.67 g/cm$^3$, the pH was 5.0, and the water content after the water treatment and the dehydration treatment was 4 mass %. The number of radishes having 1 g or more of enlarged roots, relative to the 15 holes in which they were grown, was 14. Evaluation of the degree of growth of seedlings using these chips showed that the fresh weight of the above-ground parts was 12.1 g, the dry matter weight of the above-ground parts was 0.98 g, and the ratio of dry matter in the above-ground parts was 8.0%. Ranking was determined by conducting determination of significant difference using the Tukey's test, and gave a D rating.

Example 8

To a 250 L reaction vessel, 20 kg of the cylindrical ethylene-vinyl alcohol copolymer chips prepared in Example 7 and 200 L of ion-exchange water were added and stirred with heating at 75° C. for 4 hours. The chips were dehydrated in a centrifuge and then removed to give cylindrical ethylene-vinyl alcohol copolymer chips. The cylindrical chips had a straight distance A along axial direction X of 3.92 mm and a diameter B of 1.59 mm (aspect ratio (A/B): 2.47). The arithmetic mean roughness (Ra) of the side face (circumferential face) of the chips was 0.12 µm, the amount of water retention was 12 g/100 mL, the bulk density was 0.71 g/cm$^3$, the pH was 5.0, and the water content after the water treatment and the dehydration treatment was 17 mass %. The number of radishes having 1 g or more of enlarged roots, relative to the 15 holes in which they were grown, was 14. Evaluation of the degree of growth of seedlings using these chips showed that the fresh weight of the above-ground parts was 14.8 g, the dry matter weight of the above-ground parts was 1.18 g, and the ratio of dry matter in the above-ground parts was 8.0%. Ranking was determined by conducting determination of significant difference using the Tukey's test, and gave a C rating.

Example 9

Chips were prepared as in Example 6, except that in the step of extrusion and precipitation, the interval of extruding at 16 kg per hour and cutting was changed to 2.2 times higher, thus giving cylindrical chips having a straight distance A along axial direction X of 10.0 mm and a diameter B of 2.0 mm. The resulting cylindrical chips were washed as in the preparation of the hydrous ethylene-vinyl alcohol copolymer chips (washed product) in Example 6, thus giving chips having a straight distance A along axial direction X of 10.02 mm and a diameter B of 1.95 mm (aspect ratio (A/B): 5.14). The arithmetic mean roughness (Ra) of the side face (circumferential face) of the chips was 1.99 µm, the amount of water retention was 12 g/100 mL, the bulk density was 0.74 g/cm$^3$, the pH was 5.0, and the water content after the water treatment and the dehydration treatment was 90 mass %. The number of radishes having 1 g or more of enlarged roots, relative to the 15 holes in which they were grown, was 14. Evaluation of the degree of growth of seedlings using these chips showed that the fresh weight of the above-ground parts was 17.6 g, the dry matter weight of the above-ground parts was 1.37 g, and the ratio of dry matter in the above-ground parts was 7.8%. Ranking was determined by conducting determination of significant difference using the Tukey's test, and gave a B rating.

Example 10

The dried cylindrical ethylene-vinyl alcohol copolymer chips used in Example 6 were formed into a monolayer film using the 20 mm extruder "D2020" (from Toyo Seiki Seisaku-Sho, Ltd.) (D (mm)=20, L/D=20, compression ratio=2.0, screw: full flighted), under the following conditions.

Film Preparation Conditions

Extrusion temperature: feed zone/compression zone/metering zone/die=180° C./220° C./220° C./220° C.
Screw rotation speed: 80 rpm
Amount of discharge: 2.6 kg/hr
Take-up roll temperature: 80° C.
Take-up roll speed: 1.2 m/min
Air was blasted through an air knife at 30 m/second simultaneously when the chips were extruded from a die onto a roll, thus giving a 0.10 mm thick ethylene-vinyl alcohol copolymer monolayer film. Six layers of the ethylene-vinyl alcohol copolymer monolayer film were then laminated on one another and passed through a nip roll heated to 80° C., and the laminated product was ground in a grinder for films and sheets (from Horai Co., Ltd.) with a screen opening size adjusted to 15 mm, thus giving chips in the form of laminated flakes. The main faces of the resulting chips had a maximum length of 10.6 mm and a thickness of 0.60 mm (aspect ratio: 17.67). The arithmetic mean roughness (Ra) of the main faces of the chips was 0.32 µm, the amount of water retention was 14 g/100 mL, the bulk density was 0.26 g/cm$^3$, the pH was 5.0, and the water content after the water treatment and the dehydration treatment was 4 mass %. The number of radishes having 1 g or more of enlarged roots, relative to the 15 holes in which they were grown, was 14. Evaluation of the degree of growth of seedlings using these chips showed that the fresh weight of the above-ground parts was 18.3 g, the dry matter weight of the above-ground parts was 1.58 g, and the ratio of dry matter in the above-ground parts was 8.5%. Ranking was determined by conducting determination of significant difference using the Tukey's test, and gave a B rating.

Example 11

An ethylene-vinyl alcohol copolymer monolayer film with a thickness of 0.11 mm was prepared as in Example 10, except that the film preparation conditions were changed as shown below, and air was not blasted with an air knife at 30 m/second simultaneously when the chips were extruded from the die onto the take-up roll.

Film Preparation Conditions

Extrusion temperature: feed zone/compression zone/metering zone/die=180° C./220° C./220° C./220° C.
Screw rotation speed: 80 rpm
Amount of discharge: 2.6 kg/hr
Take-up roll temperature: 80° C.
Take-up roll speed: 1.1 m/min
The resulting monolayer sheet was ground with a screen opening size inside the grinder for films and sheets used in Example 10 being adjusted to 5 mm, thus giving flaky chips having a maximum length of 3.51 mm and a thickness of 0.11 mm (aspect ratio: 31.91) of the main faces of the chips. The arithmetic mean roughness (Ra) of the main faces of the chips was 3.21 µm, the amount of water retention was 28 g/100 mL, the bulk density was 0.26 g/cm$^3$, the pH was 5.0, and the water content after the water treatment and the dehydration treatment was 4 mass %. The number of radishes having 1 g or more of enlarged roots, relative to the 15 holes in which they were grown, was 14. Evaluation of the degree of growth of seedlings using these chips showed that the fresh weight of the above-ground parts was 23.2 g, the dry matter weight of the above-ground parts was 1.81 g, and the ratio of dry matter in the above-ground parts was 7.8%. Ranking was determined by conducting determination of significant difference using the Tukey's test, and gave an A rating.

TABLE 2

| | Ex. 6 | Ex. 7 | Ex. 8 | Ex. 9 | Ex. 10 | Ex. 11 |
|---|---|---|---|---|---|---|
| Resin Type | EVOH | EVOH | EVOH | EVOH | EVOH | EVOH |
| Shape | Cylindrical | Cylindrical | Cylindrical | Cylindrical | Flaky | Flaky |
| Bulk Density (g/cm$^3$) | 0.67 | 0.67 | 0.71 | 0.74 | 0.26 | 0.26 |
| pH | 5.0 | 5.0 | 5.0 | 5.0 | 5.0 | 5.0 |
| Surface Roughness (µm) | 0.04 | 0.09 | 0.12 | 1.99 | 0.32 | 3.21 |

TABLE 2-continued

|  |  | Ex. 6 | Ex. 7 | Ex. 8 | Ex. 9 | Ex. 10 | Ex. 11 |
|---|---|---|---|---|---|---|---|
| Amount of Water Retention (g/100 mL) | | 4 | 11 | 12 | 13 | 14 | 28 |
| Water Content after Water Treatment (mass %) | | 4 | 4 | 17 | 90 | 4 | 4 |
| Number of Enlarged Roots (Number) | | 11 | 14 | 14 | 14 | 14 | 14 |
| Degree of Growth of Seedlings | Fresh Weight of Above-Ground Parts (g) | 9.4 | 12.1 | 14.8 | 17.6 | 18.3 | 23.2 |
|  | Dry Matter Weight of Above-Ground Parts (g) | 0.79 | 0.98 | 1.18 | 1.37 | 1.58 | 1.81 |
|  | Ratio (%) of Dry Matter in Above-Ground Parts | 8.4 | 8.0 | 8.0 | 7.8 | 8.5 | 7.8 |
|  | Rating | E | D | C | B | B | A |

REFERENCE SIGNS LIST

1: chip; 2: side face; 3a, 3b: end face (cut face); 11: chip; 12: curved face in the circumferential direction with the shorter-side direction taken as the central axis; 13a, 13b: end face (cut face); 21: chip; 22a, 22b: main face; 51: plant cultivation apparatus; 52: planter; 53: opening; 54: side wall; 54a: upper end of side wall; 55: drain hole; 56: water; 57: bottom wall; 58: rack; 58a: mounting face of rack; 59: water-absorbing sheet; 59a: central portion of water-absorbing sheet; 59b: end of water-absorbing sheet; 60: root-proof water-permeable sheet; 60a: end of root-proof water-permeable sheet; 61: plant; 62: plant cultivation medium; and 63: chip.

The invention claimed is:

1. A medium for plant cultivation comprising a chip comprising an ethylene-vinyl alcohol copolymer, an extract obtained by treating 10 g of the ethylene-vinyl alcohol copolymer with 50 mL of ion-exchange water at 95° C. for 4 hours and having a pH at 25° C. not less than 4 and not more than 9,
wherein the chip is cylindrical, flat, and/or flaky in shape, and has an arithmetic mean roughness (Ra), as measured in accordance with JIS B0601, of 0.10 to 10 μm, on a side face of the cylindrical chip, on a curved face of the flat chip in a circumferential direction with a shorter-side direction taken as a central axis, or on a main face of the flaky chip.

2. The medium for plant cultivation according to claim 1, wherein a content of an ethylene unit in the ethylene-vinyl copolymer is 20 mol % or more.

3. The medium for plant cultivation according to claim 1, wherein the medium for plant cultivation has an amount of water retention not less than 5 g and not more than 50 g, relative to a volume of 100 mL.

4. The medium for plant cultivation according to claim 1, wherein the chip is cylindrical in shape.

5. The medium for plant cultivation according to claim 1, herein the chip is flat in shape.

6. The medium for plant cultivation according to claim 1, wherein the chip is flaky in shape.

7. The medium for plant cultivation according to claim 1, wherein the arithmetic mean roughness (Ra), as measured in accordance with MS B0601, is from 0.10 to 3.21 μn.

8. An apparatus for plant cultivation comprising the medium for plant cultivation according to claim 1.

9. A method for plant cultivation, comprising employing the medium for plant cultivation according to claim 1.

\* \* \* \* \*